United States Patent
Kienzle

(10) Patent No.: US 9,064,217 B2
(45) Date of Patent: Jun. 23, 2015

(54) HANDLING INCIDENTS RELATED TO BUSINESS PROCESSES

(75) Inventor: Matthias Kienzle, Mannheim (DE)

(73) Assignee: SAP SE, Walldorf (DE)

( * ) Notice: Subject to any disclaimer, the term of this patent is extended or adjusted under 35 U.S.C. 154(b) by 431 days.

(21) Appl. No.: 13/334,053

(22) Filed: Dec. 22, 2011

(65) Prior Publication Data

US 2013/0166722 A1 Jun. 27, 2013

(51) Int. Cl.
*G06F 15/16* (2006.01)
*G06Q 10/00* (2012.01)
*H04L 12/26* (2006.01)
*H04L 12/24* (2006.01)

(52) U.S. Cl.
CPC ............... *G06Q 10/00* (2013.01); *H04L 43/04* (2013.01); *H04L 41/06* (2013.01); *H04L 41/50* (2013.01)

(58) Field of Classification Search
CPC ........................................................ H04L 29/00
See application file for complete search history.

(56) References Cited

U.S. PATENT DOCUMENTS

| | | | |
|---|---|---|---|
| 6,943,703 B2 * | 9/2005 | Rubenstein | 340/988 |
| 2004/0243661 A1 * | 12/2004 | Ahn et al. | 709/200 |
| 2007/0280118 A1 * | 12/2007 | Takahashi et al. | 370/241 |
| 2012/0303772 A1 * | 11/2012 | Ennis | 709/223 |
| 2013/0166722 A1 * | 6/2013 | Kienzle | 709/224 |

* cited by examiner

*Primary Examiner* — Lynn Feild
*Assistant Examiner* — Keyvan Emdadi

(57) ABSTRACT

In one embodiment, the method includes identifying an incident associated with a scene. The incident is identified through a reporter object associated with the scene. Based upon the identified incident, one or more observer objects related to the scene is determined. The incident is communicated to the one or more observer objects.

18 Claims, 7 Drawing Sheets

HANDLING INCIDENTS RELATED TO BUSINESS PROCESSES

BACKGROUND

Business processes involve several data related to an entity or a business object. A status of a data may change while executing the business processes. The status change may correspond to a modification of content or a value of the data. For example, the value of an address of a customer business object may change or be modified. The modification of the data may correspond to an event or incident. It may be required to execute an action based upon the event. Typically, in response to the event, a specific reaction is executed. Usually, an event handler executes such reaction corresponding to the event.

The event handler is required to be aware of the business processes in detail in order to handle the event and/or to execute a specific reaction corresponding to the events. For example, the event handler may be required to know about a software module (e.g., software code) responsible for triggering the event. Further, the event handler may also be required to know which implementation deals with which event. Therefore, the coding triggering the event and its corresponding reaction code is hardcoded in the event handler. Typically, there is a strict coupling between the event and the event handler.

However, it may be a waste of resource, time, and effort to link all possible incidents and their corresponding reaction codes. Further, if there is more than one software module triggering the same incident, an event handler is required to be hardcoded exactly about the incident triggered by a particular software module. Also, the event handler is not flexible and robust to adapt to changes. For example, if a new process is included, the details of the new process will need to be explicitly hardcoded in the event handler. Also, if there is any change in an existing process, the code of the event handler is required to be updated accordingly.

SUMMARY OF THE INVENTION

Various embodiments of systems and methods for handling incidents related to business processes are described herein. In one aspect, the method executed by one or more computers in a network of computers includes identifying an incident associated with a scene related to a business process. The incident is identified through a reporter object associated with the scene. One or more observer objects related to the scene are determined. The incident is communicated to the one or more observer objects. The reporter object and the observer object are loosely coupled by the scene and its access control. The loose coupling provides flexibility and robustness needed to adapt to changes. The business processes, the reporter object, and the observer object can be independently modified without affecting each other. Additionally, the observer object is not required to be hardcoded with the details of the incident. For example, the observer object is not required to be hardcoded with either the details of the reporter object of the incident nor the business process in which the incident occurred.

These and other benefits and features of embodiments of the invention will be apparent upon consideration of the following detailed description of preferred embodiments thereof, presented in connection with the following drawings.

BRIEF DESCRIPTION OF THE DRAWINGS

The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
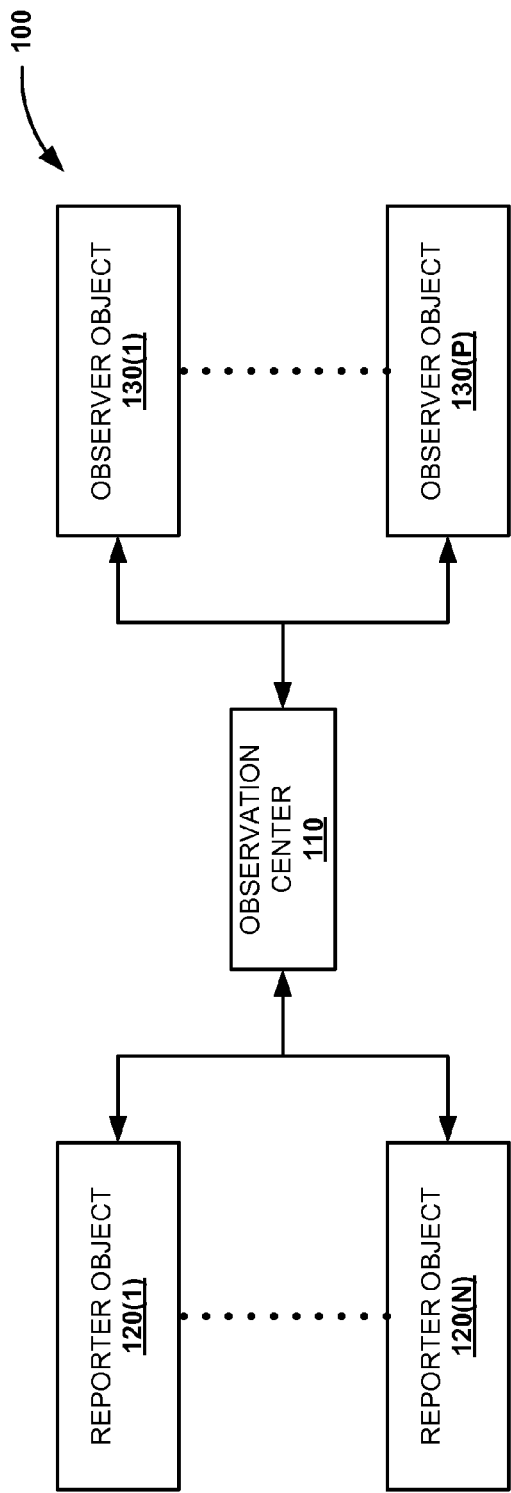
FIG. 1 is a block diagram of a system including an observation center for handling incidents, according to an embodiment of the invention.

Embodiments of techniques for handling incidents occurring during a business process are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

The following terminology is used while disclosing embodiments of the invention:

A scene is a collection of one or more incidents. The scene may be represented as a set comprising the one or more incidents. The set defines which incidents might occur within the scene.

An incident is an occurrence happening within the scene. According to one embodiment, the incident might be triggered due to a modification of data associated with the scene and/or changes of status, e.g., navigation to a new view or window.

A reporter object is an object that is allowed as a reporter for one or more scenes. An observation center grants admittance to the reporter object to report about incidents related to one or more scenes. The reporter object calls a function to register itself as the reporter at the observation center. The observation center grants admittance to the registering reporter object with respect to a defined reporter admittances specified for a scene. If a reporter object satisfies admittances defined across all scenes, the reporter object might report for all of the scenes. Alternately, the reporter object is not allowed to report about the incidents in the scene for which the reporter object has no admittance for. The reporter object identifies the incidents related to the one or more scenes for which the reporter object is registered as the reporter. The reporter object reports about the identified incidents to the observation center.

An observer object is an object that is allowed as an observer for one or more scenes by the observation center. The observer object calls a function to register itself as the observer at the observation center. The observation center grants admittance to the registering observer object with respect to a defined observer admittances specified for a scene. If the observer object satisfies admittances defined across all scenes, the observer object might observe all of the scenes. Alternately, the observer object is not allowed to observe the incidents in the scene for which the observer object has no admittance for. The observer object is reported by the observation center about the incidents related to the one or more scenes for which the observer object is registered as the observer. The observer object observes and reacts upon the reported incidents.

The observation center is a central entity that receives incident information from the reporter object associated with a scene and communicates the received incident information to the observer object related to that scene. The observation center loosely couples the reporter object and the observer object. The observation center also implements an access control to allow only specified object types as the reporters and/or observers. The object types that may be allowed as the reporters (reporter admittances) and/or the observers (observer admittances) are specified in respective database tables of the reporter object and/or the observer object.

One or more reporter objects may be registered as the reporter for a scene.

One or more observer objects may be registered as the observer for a scene.

FIG. 1 illustrates one embodiment of a system 100 including an observation center 110 for coupling one or more reporter objects 120(1)-120(N) and one or more observer objects 130(1)-130(P) for handling incidents. An incident associated with a scene e.g., scene 210(1) (FIG. 2) may be reported to the observation center 110 by a reporter object 120(1). Once the incident IC1 is reported to the observation center 110, the observation center 110 identifies the incident IC1. The observation center 110 determines at least one observer object of the one or more observer objects 130(1)-130(P) associated with the observation center 110 and the scene 210(1). For example, the observation center 110 may determine that the observer object 130(1) is associated with the scene 210(1). The incident IC1 is communicated to the observer object 130(1) for appropriate reaction.

Figure 2:
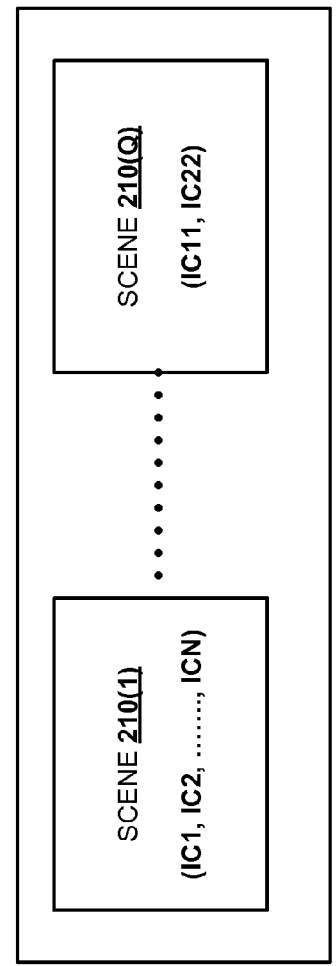
FIG. 2 illustrates various scenes, according to an embodiment of the invention.

FIG. 2 illustrate one or more scenes 210(1)-210(Q), according to an embodiment of the invention. The scene, e.g., scene 210(1) may include one or more incidents IC(1)-IC(N). Alternately, the incidents IC(1)-IC(N) are defined for the scene 210(1). Each scene 210(1)-210(Q) has a unique name. In one embodiment, the scene 210(1) not only includes one or more predefined types of incidents (IC1-ICN) assigned to the scene 210(1), rather, the scene 210(1) is open to one or more incidents of types that are not predefined for the scene. A scene that is open to include incidents that are not of a predefined type is termed as a 'dynamic scene.' In one embodiment, the scene 210(1) could be declared as a 'dynamic scene' if all possible incidents cannot be predicted at design time. A scene that includes only a definite types of incidents IC(1)-IC(N) is termed as a 'static scene.'

Various information related to each scene 210(1)-210(Q) may be maintained in data structures related to the respective scene 210(1)-210(Q). In one embodiment, there may be one database table maintaining the information related to all scenes 210(1)-210(Q). An exemplary template of such a database table 210(1)-210(Q) is shown in table 1 below.

TABLE 1

| Field | Type | Description |
| --- | --- | --- |
| NAME | BS_INOB_SCENE_NAME (CHAR (n)) | Unique Name of the Scene |
| IS_DYNAMIC | BS_INOB_DYNAMIC_SCENE (BOOL) | Defines if the scene is Dynamic |
| DESCRIPTION | BS_INOB_SCENE_DESCRIPTION | A short description of the scene |

In the above shown Table 1, "NAME" indicates unique name of a scene. For example, the name of scene 210(1) may be "abc". A value of the "NAME" field may be a variable of data type "Character" (indicated as "CHAR" in Table 1) and there may be a limitation on the maximum number of characters that may be included in the name of the scene (indicated as "(n)" in Table 1, "n" being natural number). For example, the value of "n" may be 30.

"IS_DYNAMIC" indicates if the scene (e.g., scene 210(1)) is a dynamic scene. The values of the "IS_DYNAMIC" field could be of "Boolean" data type (indicated as "BOOL" in Table 1). For example, "Boolean" value may be "YES" or "NO", or it may be "1" or "0". If the scene is dynamic, the value of the "IS_DYNAMIC" field may be "YES," while if the scene is static or non-dynamic, the value of the "IS_DYNAMIC" field may be "NO". In one embodiment, the "IS_DYNAMIC" field may store a "Boolean" value as defined by a specific programming language, e.g., Advanced Business Application Programming (ABAP) developed by the company SAP AG. "DESCRIPTION" field could include a short description of a scene, e.g., the description of scene 210(1).

Once the scene 210(1) is defined, e.g., declared in the database table with a structure similar to the structure presented with Table 1, the one or more incidents IC(1)-IC(N) may be defined for the scene 210(1). An incident, e.g., incident IC1 may be triggered if there is any modification (updation, deletion, and addition) of data related to a scene, e.g., the scene 210(1). For example, if address data associated with a customer business object is modified, the incident IC1 related to scene 210(1) may be triggered. A type of incident IC1 may be the type of the modified data for which the incident IC1 is triggered. For example, the type of the incident IC1 may be "Character" if the incident IC1 is related to data of "Character" type (e.g., the customer's address). In one embodiment, all valid data types or incident types are defined in a data dictionary. For example, the data dictionary may be an ABAP dictionary defined in SAP library as DDIC. In one embodiment, the incident IC1 may be a multivalued incident. The multivalued incident IC1 is triggered for a multivalued data. In one embodiment, the multivalued data may be a table comprising a plurality of records (rows). The type of the multivalued incident IC1 may be the table, e.g., a DDIC table.

Various information related to incidents IC(1)-IC(N) may be maintained in data structure, e.g., related to the respective incidents IC(1)-IC(N). In one embodiment, there may be one database table maintaining the information related to the possible types of incidents IC(1)-IC(N) in a scene. Table 2 below shows an exemplary template of database table, e.g., associated with incident IC(1)-IC(N):

TABLE 2

| Field | Type | Description |
|---|---|---|
| SCENE | BS_INOB_SCENE_NAME (CHAR(n)) | Unique name of the scene |
| INCIDENT | BS_INOB_INCIDENT_NAME (CHAR(m)) | Name of the incident, unique per scene |
| TYPE | TYPENAME (CHAR(o)) | DDIC type of the incident's value |
| IS_MULTIPLE | BS_INOB_MULTIPLE_INCIDENT BOOL | Defines if the incident is multivalued |

Field "SCENE" indicates the unique name of the scene to which an incident belongs or to which the incident is assigned to. For example, the "SCENE" field may store the unique name of the scene 210(1) to which the incident IC1 belongs to. The values of the "SCENE" field may be of "Character" data type with maximum number of characters "n" (indicated as "CHAR(n)" in Table 2). For example, the name may include maximum 30 characters.

Field "INCIDENT" indicates a name of the incident. The name of the incident has to be unique per scene. If two incidents (e.g., IC1 and IC11) belong to two different scenes (e.g., 210(1) and 210(Q), respectively), they can have same name, however, if the incidents (e.g., IC(1) and IC (N)) belong to the same scene (e.g., 210(1)), they should have unique names. The names of the incidents may be values of type "Character" with maximum number of characters "m". For example, the name may include maximum 30 characters.

Field "TYPE" indicates the DDIC type of the incident. The DDIC type of the incident corresponds to the DDIC type of the value of data that is being modified. Alternately, the DDIC type of the incident corresponds to the DDIC type of the value of data for which the incident is triggered. The DDIC type may "Character" with maximum number of characters "o". For example, the DDIC type may include maximum 30 characters.

Field "IS_MULTIPLE" indicates if the incident is a multivalued incident, i.e., if the incident is triggered in response to a modification to multivalued data. The multivalued data may include more than one value, e.g., stored as different elements, records (rows), etc. If an incident is of multivalued data type, the "TYPE" field may include DDIC name corresponding to the multivalued data type. The values of the "IS_MULTIPLE" field are of type "Boolean" (indicated as "BOOL" in Table 2). If an incident is multivalued, the corresponding value of the "IS_MULTIPLE" field may be 'YES,' while if the incident is not multivalued, the value of the "IS_MULTIPLE" field may be 'NO.' In one embodiment, the possible values of the "IS_MULTIPLE" field may be the "Boolean" values in ABAP.

The incidents IC(1)-IC(N) related to the scene 210(1) may be identified by the reporter object 120(1) associated with the scene 210(1). In one embodiment, the reporter object 120(1) should be granted an access as the reporter to report about incidents IC(1)-IC(N) associated with the scene 210(1). In one embodiment, if the scene 210(1) is dynamic scene, the reporter object 120(1) can report about other incident or incidents besides the incidents IC(1)-IC(N) explicitly assigned to the scene 210(1). In one embodiment, one or more of the reporter object 120(1)-120(N) may be associated each with more than one of the scenes 210(1)-120(N).

Various information related to a reporter object 120(1)-120(N) may be maintained in a corresponding data structure. In one embodiment, there may be one database table maintaining the information related to the reporter objects 120(1)-120(N). An exemplary template of such database table for the reporter objects 120(1)-120(N) is shown in Table 3 below:

TABLE 3

| Field | Type | Description |
|---|---|---|
| SCENE | BS_INOB_SCENE_NAME (CHAR (m)) | Name of the scene for which the reporter is allowed |
| REPORTER_TYPE | BS_INOB_ REPORTER_TYPE (CHAR (n)) | Type of reporter |
| REPORT_DESCR | BS_INOB_ REPORTER_DESCRIPTION (CHAR (0)) | Description of reporter |

As illustrated in Table 2 above, field "REPORTER_TYPE" of the database table indicates a type of an object (e.g., ABAP object) that is registered as a reporter for the SCENE. In one embodiment, the object TYPE may be specified by a class name or the name of an interface to which the reporter object may belongs to. In one embodiment, objects of the above-mentioned object types may be accepted by an observation center as reporters for a scene indicates with the field "SCENE". The values of the "REPORTER_TYPE" may be of type "Character" with maximum number of characters "n" (indicates as "CHAR(n)" in the Table 3).

The field "SCENE" indicates the name of the scene. Field "REPORT_DESCR" includes a description of the reporter. For example, the "REPORT_DESCR" field may include description of admittance or explanation why this type of reporter is allowed or applicable as reporter.

The reporter objects 120(1)-120(N) get registered as the reporter for one or more of scenes 210(1)-210(Q). For example, the reporter object 120(1) may register itself as the reporter. In one embodiment, reporter objects (e.g., 120(1)-120(N)) register themselves at the corresponding observation center (e.g., 110).

Figure 3:
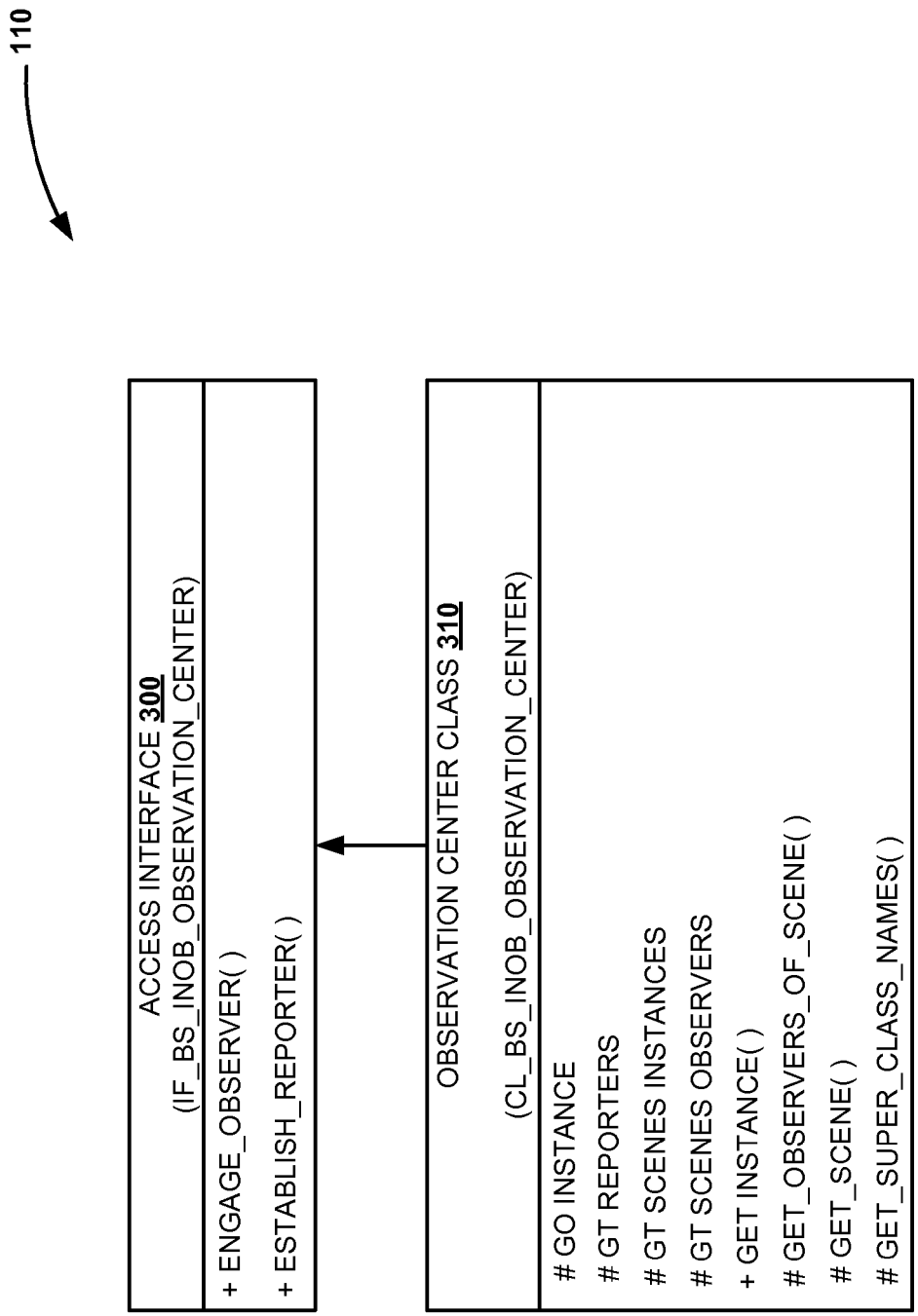
FIG. 3 is a block diagram of the observation center, according to an embodiment of the invention.

The observation center 110 is a central instance for incident observation. The reporter objects 120(1)-120(N) and the observer objects 130(1)-130(P) register at the observation center 110 to report about the incidents and to observe the incidents, respectively. The observation center 110 may be defined as an access interface 300, as shown in FIG. 3. In one embodiment, the name of the access interface 300 may be "IF_BS_INOB_OBSERVATION_CENTER". The access interface 300 includes one or more functions. For example, the access interface 300 includes a function "ESTABLISH_REPORTER( )". The function "ESTABLISH_REPORTER( )" may be called by the reporter objects 120(1)-120(N) to register themselves as the reporters at the observation center 110. In one embodiment, by calling the function "ESTABLISH_REPORTER( )" an object let establishes itself or any other object as a reporter. The access interface 300 may also include a function "ENGAGE_OBSERVER( )". The function "ENGAGE_OBSERVER( )" may be called by observer objects 130(1)-130(P) to register themselves as observers at the observation center 110.

The access interface 300 may be implemented by an observation center class 310. The name of the observation center class 310 may be "CL_BS_INOBOBSERVATION_CENTER" ("CL" indicates "class"). The observation center class 310 has a single runtime instance (singleton instance) per logical unit of work (LUW). The observation center class 310 includes one or more attributes and one or more functions. In one embodiment, the observation center class 310 includes the attribute "GO_INSTANCE" to hold the singleton instance of the observation center 110. An attribute "GT_REPORTERS" ("GT" indicates "global table") is a table including names or references of one or more reporters (e.g., reporter objects 120(1)-120(N)) that are registered at the observation center 110. The observation center class 310 also includes an attribute "GT_SCENE_INSTANCES" that is the table comprising references of existing scenes. In one embodiment, the table "GT_SCENE_INSTANCES" comprises the references of those scenes which can be accessed by at least one reporter object and/or one observer object. The names of all the scenes 210(1)-210(Q) that are registered at the observation center 110. Similarly, the observation center class 310 also includes an attribute "GT_SCENE_OBSERVERS" that is the table comprising names and/or reference to the observer objects 130(1)-130(P) per scene.

In one embodiment, the observation center class 310 includes a function "GET_INSTANCE( )" which may be used or called by an external entity, e.g., the reporters 120(1)-120(N) and/or the observers 130(1)-130(P) to invoke an instance of the observation center 110. Once the instance is invoked, the observation center 110 becomes visible to the reporters 120(1)-120(N) and the observers 130(1)-130(P). A subsequent call of the function "GET_INSTANCE" returns an identical instance or reference to the observation center 110. The observation center class 310 also includes a function "GET_OBSERVER_OF_SCENE( )" which may be exclusively called by the observation center 110 to retrieve names and references or instances of the objects to access or communicate with the objects. A function "GET_SCENE( )" of the observation center class 310 may be called by the observation center 110 to retrieve a reference to a scene as an object that will be used by the observation center 110 to determine whether the incidents (e.g., IC1-ICN) and their reported values are valid for instance. Typically, the function "GET_SCENE( )" is used to check if the incident reported by the reporter object is the valid incident that belongs to the specified scene. The observation center class 310 also includes a function "GET_SUPER_CLASS_NAMES( )" which may be called by the observation center 110 to check if the reporters 120(1)-120(N) and/or the observers 130(1)-130(P) are valid and belongs to the objects that are allowed as the reporters and observers, respectively, for the scene. The function "GET_SUPER_CLASS_NAMES( )" allows to get access to all super types of an object. The function "GET_SUPER_CLASS_NAMES( )" may be called during determination whether an object trying to register as an observer and/or a reporter has a valid type to be accepted the observer and/or the reporter, respectively. Alternately, the observation center 110 may call the function "GET_SUPER_CLASS_NAMES( )" while registering the reporters 120(1)-120(N) and/or the observers 130(1)-130(P).

For getting registered as the reporter, the reporter object 120(1) calls the function "GET_INSTANCED" of the observation center 110. Once the function "GET_INSTANCE( )" is called, the instance of the observation center 110 becomes visible to the reporter object 120(1). Once the observation center 110 becomes visible to the reporter object 120(1), the reporter object 120(1) can access or call the functions of the observation center interface (i.e., the access interface 300). In one embodiment, the reporter object 120(1) calls the function "ESTABLISH_REPORTER( )" to register itself as the reporter. Once the function "ESTABLISH_REPORTER( )" is called, the observation center 110 may internally call the function "GET_SUPER_CLASS_NAMES( )" to check if the reporter object 120(1) can be allowed as the reporter. If the reporter object 120(1) can be allowed, the observation center 110 registers the reporter object 120(1) as the reporter all scenes that allow objects of that type.

Figure 4:
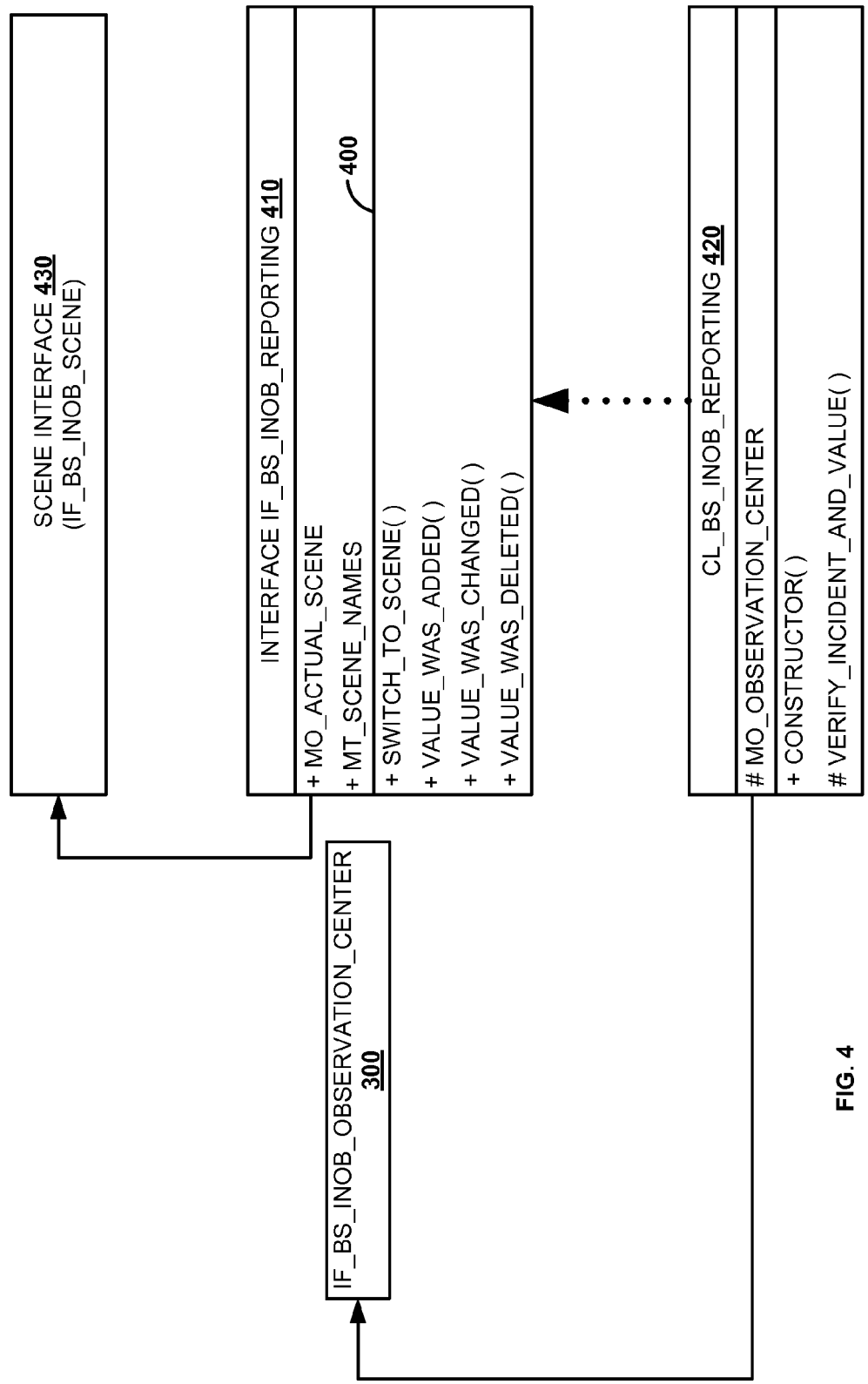
FIG. 4 illustrates a reporter protocol used by the reporter objects for reporting incidents to the observation center, according to an embodiment of the invention.

Once the reporter object 120(1) is registered, the observation center 110 can access the database table of the reporter object 120(1). In one embodiment, the name of the reporter object 120(1) may be entered in the "GT_REPORTERS" table. In one embodiment, the registered reporter object 120(1) can access a reporter protocol 400 (FIG. 4). The reporter protocol 400 enables the reporter object 120(1) to report incidents to the observation center 110. The reporter protocol 400 is defined by an interface 410. A name of the interface 410 may be "IF_INOB_REPORTING." The interface 410 includes one or more attributes and one or more functions. For example, the interface 410 may include the attributes namely "MO_ACTUAL_SCENE" and "MT_SCENE_NAMES."

The attribute "MT_SCENE_NAMES" holds names of all the scenes for which the reporter protocol 400 can be used. Alternately, the attribute "MT_SCENE_NAMES" contains names of all the scenes for which the reporter 120(1) is allowed to report about. Each reporter 120(1-N) gets its own reporter protocol after acceptance by the observation center 110. In one embodiment, if the reporter object 120(1) reports about the scene that is not included in the "MT_SCENE_NAMES," an error (e.g., catchable exception) may occur.

The attribute "MO_ACTUAL_SCENE" allows the reporter object 120(1) to access its current scene. The reporter object 120(1) can access its current scene and can directly query the current scene. For example, the reporter object 120(1) may directly query the scene 210(1) for questions like the DDIC type of the incident IC1, whether the scene is dynamic, etc. Typically, the reporter object 120(1) can access a scene interface 430 ("IF_BS_INOB_SCENE") to directly query the scene 210(1). The scene 210(1) may be represented by the scene interface 430 that can be accessed by the observers 130(1)-130(P) and/or the reporters 120(1)-120(N). Through the scene interface 430 the reporters and observers can directly query the scene 210(1).

Figure 5:
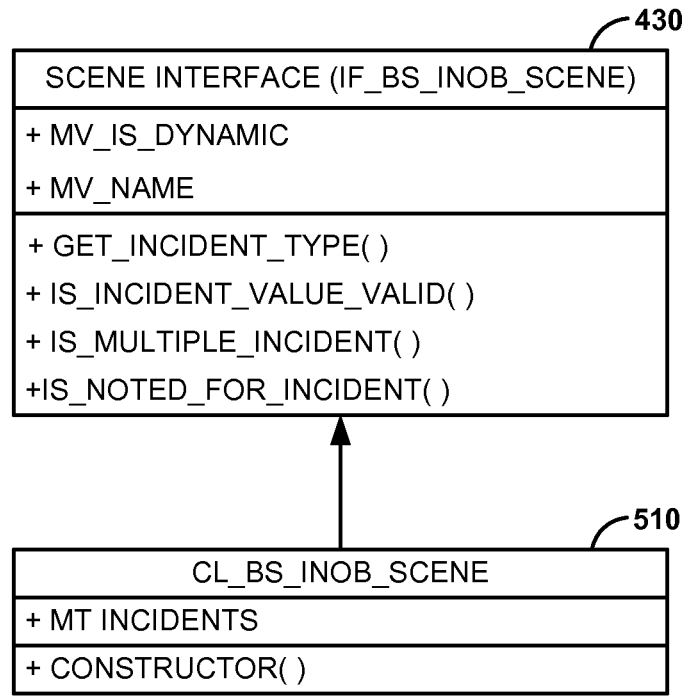
FIG. 5 illustrates a scene interface to enable the observation center to query the scene, according to an embodiment of the invention.

In one embodiment, as illustrated in FIG. 5, the scene interface 430 includes an attribute "MV_NAME" to hold the name of the scene 210(1) and an attribute "MV_IS_DYNAMIC" to hold the Boolean value to define if the scene 210(1) is dynamic or not. For example, if the scene 210(1) is dynamic then "MV_IS_DYNAMIC" may hold 1. The scene interface 430 also includes one or more functions. For example, the scene interface 430 includes a function "GET_INCIDENT_TYPE( )" The function "GET_INCIDENT_TYPE( )" may be called by the reporters 120(1)-120(N) and/or observers 130(1)-130(P) to get the type, e.g., DDIC type of the incident. Alternately, the function "GET_INCIDENT_TYPE( )" returns the DDIC type of the incident. In one embodiment, if the scene 210(1) is dynamic, the type of the incident may not be identified and therefore, the function "GET_INCIDENT_TYPE( )" may return an empty value.

The scene interface 430 may also include a function "IS_INCIDENT_VALUE_VALID( )." The function "IS_INCIDENT_VALUE_VALID( )" may be called by the reporters 120(1)-120(N) and/or the observers 130(1)-130(P) to determine if the incident value is valid or applies to the incident's type. The function "IS_INCIDENT_VALUE_VALID( )" may return 'true' in case the value is valid. If the value is not valid, the function "IS_INCIDENT_VALUE_VALID( )" may return 'false.' A function "IS_MULTIPLE_INCIDENT( )" may be called by the reporters 120(1)-120(N) and/or the observers 130(1)-130(P) to determine if the incident is the multivalued incident (e.g., a data table). If the incident is the multivalued incident, the function "IS_MULTIPLE_INCIDENT( )" may return 'true.' The scene interface 430 includes another function "IS_NOTED_FOR_INCIDENT( )" to determine if the incident (i.e., name of the incident) is known to the scene 210(1). The function "IS_NOTED_FOR_INCIDENT( )" returns 'true' in case the incident name is known to the scene 210(1). In one embodiment, if the scene 210(1) is the dynamic scene any incident name may be allowed.

The scene interface 430 may be instantiated by a scene class 510 ("CL_BS_INOB_SCENE"), as illustrated in FIG. 5. The scene class 510 includes an attribute "MT_INCIDENTS." The attribute "MT_INCIDENTS" contains names and types of all the incidents (IC1-ICN) that are assigned to the scene 210(1). In one embodiment, if the scene 210(1) is dynamic and has some explicitly assigned incidents (IC1-ICN) then the attribute "MT_INCIDENTS" includes the explicitly assigned incidents (IC1-ICN).

The reporter object 120(1) reports about the incident IC1 to the observation center 110. The reporter object 120(1) reports about the incident IC1 to the observation center 110 through the reporter protocol 400. In one embodiment, the reporter protocol 400 includes one or more functions namely "SWITCH_TO_SCENE( )," "VALUE_WAS-ADDED( )," "VALUE_WAS_CHANGED( )" and "VALUE_WAS_DELETED( )." The function may be used by the reporter object 120(1) to report about the incident IC1. For example, the reporter object 120(1) may use the function "VALUE_WAS_CHANGED( )" to report an incident that relates to the change of data. The scene name, the incident name, and a current (changed) value of the data are handed over to the observation center 110. In one embodiment, if the incident IC1 is multivalued, an index may also be handed over. The index identifies the row of the table that is being modified or changed. The function "VALUE_WAS_ADDED( )" may be called by the reporter object 120(1) to report an incident that relates to a newly added value in the multivalued data. The name of the scene, incident name, the newly added value, and the index related to the corresponding record or row where the value is added is handed over to the observation center 110. Similarly, the function "VALUE_WAS_DELETED( )" may be called to report about the deletion of the row of the multivalued data or table. The scene name, the incident name, the deleted value, and the index identifying the row of the table that is deleted are handed over.

In one embodiment, the reporter object 120(1) may be associated with multiple scenes 210(1)-210(Q). Alternately, the reporter object 120(1) may be allowed to report about multiple scenes 210(1)-210(Q). The function "SWITCH_TO_SCENE( )" may be called by the reporter object 120(1) to switch between the scenes to report about. For example, the reporter object 120(1) may call the function "SWITCH_TO_SCENE( )" to switch to the scene 210(2). Once the reporter object 120(1) is switched to the scene 210(2), the reporter object 120(1) may not be required to provide the scene name (i.e., the name of the scene 210(2)) every time reporting about the incident. Alternately, the scene name would be an optional parameter once the reporter object 120(1) is switched to the particular scene. The reporter object 120(1) switch to the scene 210(2) and afterwards can report about several incidents related to that scene (i.e., scene 210(2)) without handling explicit scene name every time. In one embodiment, the interface 410 including the reporter protocol 400 may be implemented by a class 420 ("CL_BS_INOB_REPORTING"). The class 420 includes one or more functions and/or one or more attributes. For example, the class 420 includes "MO_OBSERVATION_CENTER" ("MO" indicates "member object"). Typically, the class 420 is instantiated by the observation center 110.

Once the reporter object 120(1) reports about the incident IC1 to the observation center 110, the observation center 110 calls the function "GET_SCENE( )" to determine if the incident IC1 is a valid incident related to the scene 210(1). Alternately, as the reporter object 120(1) of the dynamic scene 210(1) can report about any arbitrary incident, therefore, the observation center 110 does not check the incident IC1 related to the dynamic scene 210(1).

Once the incident IC1 related to the scene 210(1) is validated, the observation center 110 calls the function "GET_OBSERVER_OF_SCENE( )" to determine the observer objects related to the scene. For example, the observation center 110 may determine that the observer object 130(1) is registered observer of the scene 210(1).

In one embodiment, the observer object 130(1) can be a type of ABAP object. Typically, the observer object 130(1) is the ABAP object implementing a specific ABAP interface. The observer object 130(1) may be the class, the interface, the logical runtime instance. In one embodiment, the objects and its subtypes may be allowed as the observer for the scene. Various information related to each observer object 130(1)-130(P) may be maintained in the database table related to the respective observer object 130(1)-130(P). In one embodiment, there may be one database table maintaining the information related to all the observer objects 130(1)-130(P). In one embodiment, the template of the database table for the observer objects 130(1)-130(P) may be as shown in table 4 below:

TABLE 4

| Field | Type | Description |
| --- | --- | --- |
| SCENE | BS_INOB_SCENE_NAME (CHAR (n)) | Name of the assigned scene |
| OBSERVER | BS_INOB_OBSERVER (CHAR (n)) | Type of allowed observer object |
| OBSERVE_DESCR | BS_INOB_OBSERVE_DESCRIPTION (CHAR (n)) | Description of observer |

As illustrated in Table 4 above, field "OBSERVER" of the database table indicates a type of the object (e.g., ABAP object) that is registered as an observer for the SCENE. In one embodiment, the object may be a name of the class object, the interface, the logical runtime instance, the subclass, etc. In one embodiment, objects of the above-mentioned object types may be accepted by an observation center as observers for a scene indicates with the field "OBSERVER". The values of the "OBSERVER" may be of type "Character" with maximum number of characters "n" (indicates as "CHAR(n)" in the Table 4).

The field "SCENE" indicates the name of the scene that describes a list of types to which the observer objects apply. Field "OBSERVE_DESCR" includes a description of the observer. For example, the field "OBSERVE_DESCR" may include description of admittance or explanation why this type of object is allowed/applicable as the observer.

In one embodiment, the observer object 130(1) register itself at the observation center 110 by calling the observation center interface function "ENGAGE_OBSERVER( )" Typically, the observer object 130(1) required to first call the function "GET_INSTANCE( )" to get a singleton instance of the observation center 110. Once the observation center 110 becomes visible to the observer objects 130 (1), the observer object 130(1) can call the function "ENGAGE_OBSERVER( )" to register itself at the observation center 110 as the observer of the scene 210(1). The observation center 110 determines if the observer object 130(1) can be allowed as an observer. Typically, the observation center 110 calls the function "GET_SUPER_CLASS_NAMES( )" to determine all types of the objects that can be allowed as an observer. If the observer object 130(1) is of an allowed type, the observer object 130(1) is registered as the observer for all corresponding scenes.

Figure 6:
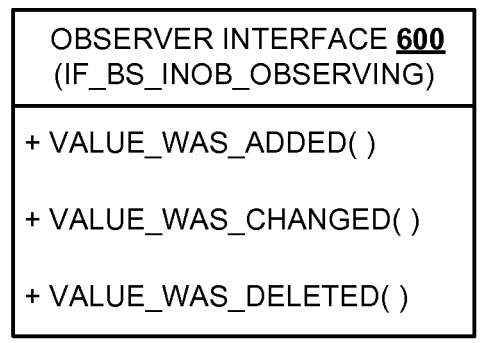
FIG. 6 illustrates an observer interface to enable communication between an observer object and the observation center, according to an embodiment of the invention

In one embodiment, the observer object 130(1) needs to implement an observer interface 600 (FIG. 6) to get registered as the observer of the scene 210(1). The observer interface 600 enables the observation center 110 to communicate with the observer object 130(1). In one embodiment, the observation center 110 can call one or more functions included in the observer interface 600 to report about the incident to the observer object 130(1). The observer interface 600 includes a function "VALUE_WAS_CHANGED( )" The function "VALUE_WAS_CHANGED( )" is called by the observation center 110 to immediately forward reporting of an incident by any reporter that reported about the incident IC1 related to the change in the value of the data to the observer object 130(1). The scene name, incident name, and the current (changed) value may be handed over to the observer object 130(1). In one embodiment, if the incident is the multivalued incident, the index indicating the row of the table in which the value is changed is also handed over. A function "VALUE_WAS_ADDED( )" may be called by the observation center 110 to report about the newly added record into the multivalued data or table to the observer object 130(1). The function "VALUE_WAS_ADDED( )" may be called by the observation center 110 to report that the new value is added to the multivalued data. The name of the scene, incident name, the newly added value, and the index related to the corresponding record or row where the value is added is handed over to the observer object 130(1). Similarly, the function "VALUE_WAS_DELETED( )" may be called by the observation center 110 when the reporter object 120(1) reports about the deletion of the line of the multivalued data to report about the deletion of the row of the multivalued data to the observer object 130(1). The scene name, the incident name, the deleted value, and the index identifying the row from the table that is deleted is handed over to the observer object 130(1).

The embodiments described above provide techniques to implement security/authority by preventing unauthorized objects from reporting the incidents and/or observing the incidents. The observation center grants admittance to the observer object and/or the reporter object by determining the defined observer admittances and/or the defined reporter admittances, respectively, specified for one or more scenes. Alternately, the observation center implements the access control to allow only specified object types as the reporters and/or observers. The object types that may be allowed as the reporters (reporter admittances) and/or the observers (observer admittances) are specified in respective database tables of the reporter object and/or the observer object. The access control implemented by referring to the admittances specified in the respective database tables provides security or authority such that the unauthorized objects may be prevented from reporting the incidents and/or observing the incidents related to the scenes. Additionally, the scenes, the incidents, the reporters, the observers, the reporter admittances, and the observer admittances, etc., is published that enables a user, e.g., a developer to easily access and integrate his or her development (e.g., the scenes, the incidents, the reporters, and the observers) into incident observation.

Figure 7:
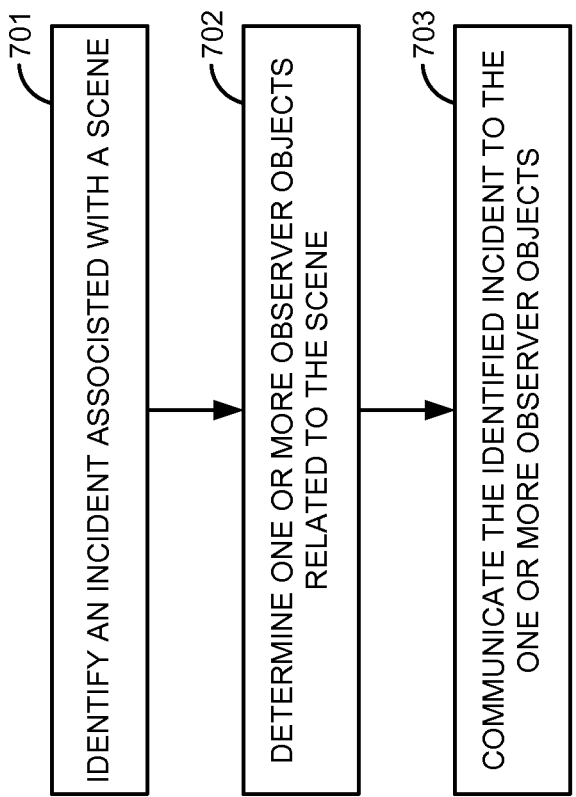
FIG. 7 is a flow chart illustrating the steps performed to handle incidents associated with a scene, according to an embodiment of the invention.

FIG. 7 is a flowchart illustrating a method for handling incidents using the observation center 110, according to an embodiment of the invention. The incident IC1 associated with the scene 210(1) may be reported to the observation center 110 by a reporter object 120(1). Once the incident IC1 is reported to the observation center 110, the observation center 110 identifies the incident IC1. The observation center 110 identifies the incident IC1 associated with the scene 210(1) at step 701. Typically, the reporter object 120(1) reports about the incident IC1 to the observation center 110. The observation center 110 receives information about the incident IC1 from the reporter object 120(1) which is registered as a reporter. Once the incident IC1 is identified, the observation center 110 determines the observer object 130(1) related to the scene 210(1) at step 702. Typically, the observation center 110 calls the function "GET_OBSERVERS_OF_SCENE( )" to determine the observer object 130(1) for the scene 210(1). Once the observer object 130(1) is determined, the observation center 110 communicates or notifies the observer object 130(1) about the incident IC1 at step 703. The observation center 110 calls the function of the observer interface 600 to report about the incident IC1 to the observer object 130(1). In one embodiment, if multiple observer objects 130(1)-130(P) are registered as the observer for the scene 210(1), the multiple observer objects 130(1)-130(P) are notified about the incident IC1 by the observation center 110.

Figure 8:
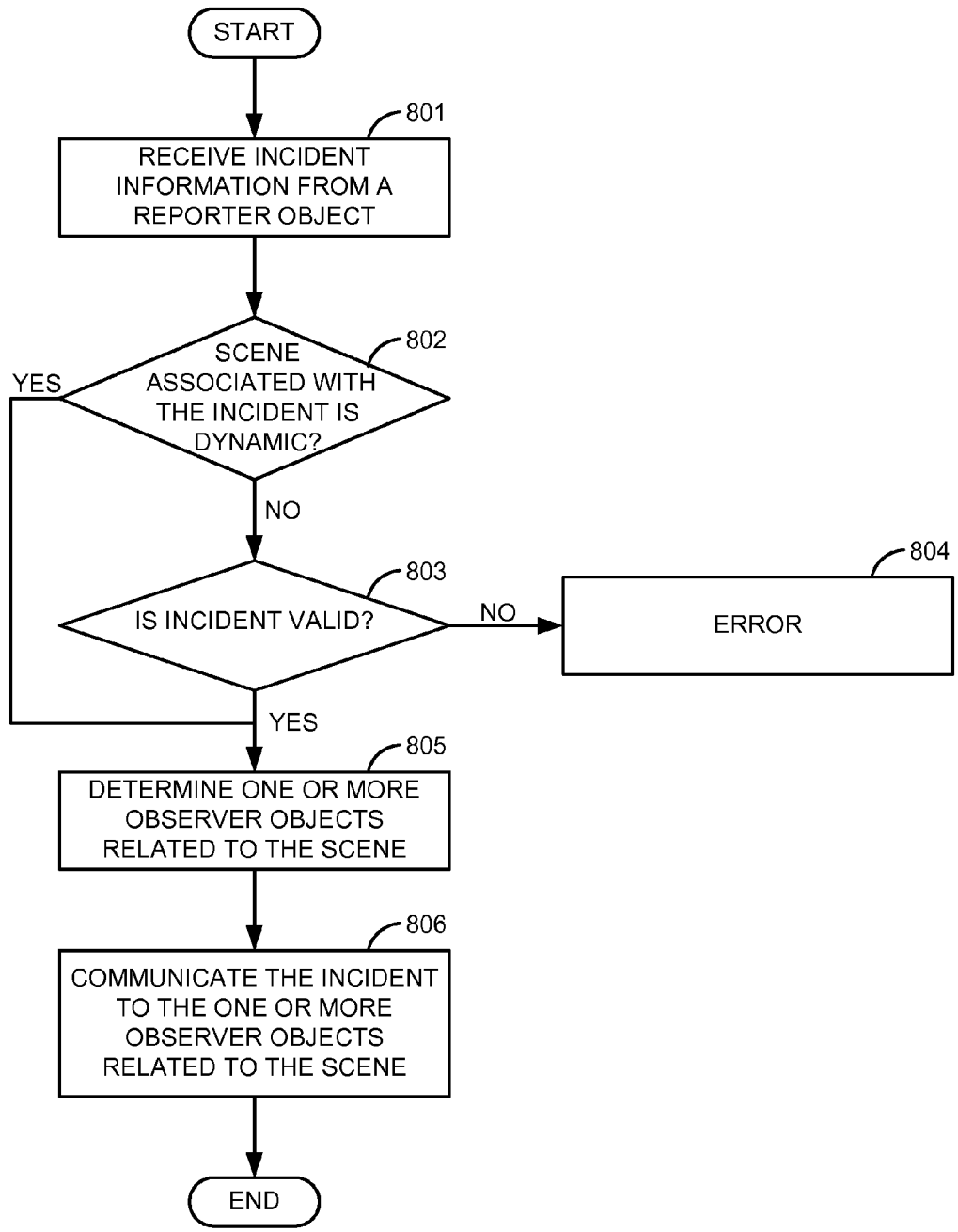
FIG. 8 is a flow chart illustrating the steps performed by the observation center when an incident is reported to the observation center, according to an embodiment of the invention.

FIG. 8 is a flowchart illustrating steps performed by the observation center 110 once the incident IC1 is reported to the observation center 110, according to an embodiment of the invention. Typically, the observation center 110 receives the information related to the incident IC1 from the reporter object 120(1) at step 801. The observation center 110 determines if the scene 210(1) to which the incident IC1 belongs is the dynamic scene at step 802. If the scene 210(1) is not dynamic (step 802: NO), the observation center 110 checks the validity of the incident IC1 associated with the scene 210(1) at step 803. Typically, the observation center 110 checks if the incident IC1 is defined for the scene 210(1). In one embodiment, the observation center 110 checks if the type of the incident IC1 is one of the types defined in the DDIC. If the incident IC1 is not valid (step 803: NO), an error might be reported at step 804. In case the incident IC1 is the valid incident (step 803: YES), the observation center 110 determines the observer object 130(1) related to the scene 210(1) at step 805. In case the scene 210(1) is the dynamic scene, the observation center 110 does not check the validity of the incident IC1 as any arbitrary incident can be reported for the dynamic scene 210(1). Therefore, if the scene 210(1) is the dynamic scene, the observation center 110 directly switch to step 805 to determine the observer object 130(1) of the scene 210(1). Once the observer object 130(1) is determined, the observation center communicates the incident IC1 to the observer object 130(1) at step 806. The observation center 110 reports about the incident IC1 to the observer object 130(1) through the observer interface 600. The observer object 130(1) might perform appropriate action corresponding to the scene IC1.

The embodiments described above provide techniques to separate the reporter object (reporting the incident) and the observer object (reacting upon the incidents). The observer object, e.g., event handler, need not know about the reporter object or the business process (triggering the incident) and vice versa. The reporter object and the observer object are loosely connected through the observation center. The loose connection between the reporter object and the observer object makes the system flexible and robust to adapt to changes or modification. Precisely, the event and the event handler can be independently modified without affecting each other. The modification of the existing business process or the addition of the new business process need not be hardcoded or linked into the event handler (reaction code) that makes system flexible and robust to adapt to the modification. Moreover, obviating the requirement of hardcoding the details of the incident into the observer object saves resource, time, and effort, and provides an efficient technique for handling the incidents.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
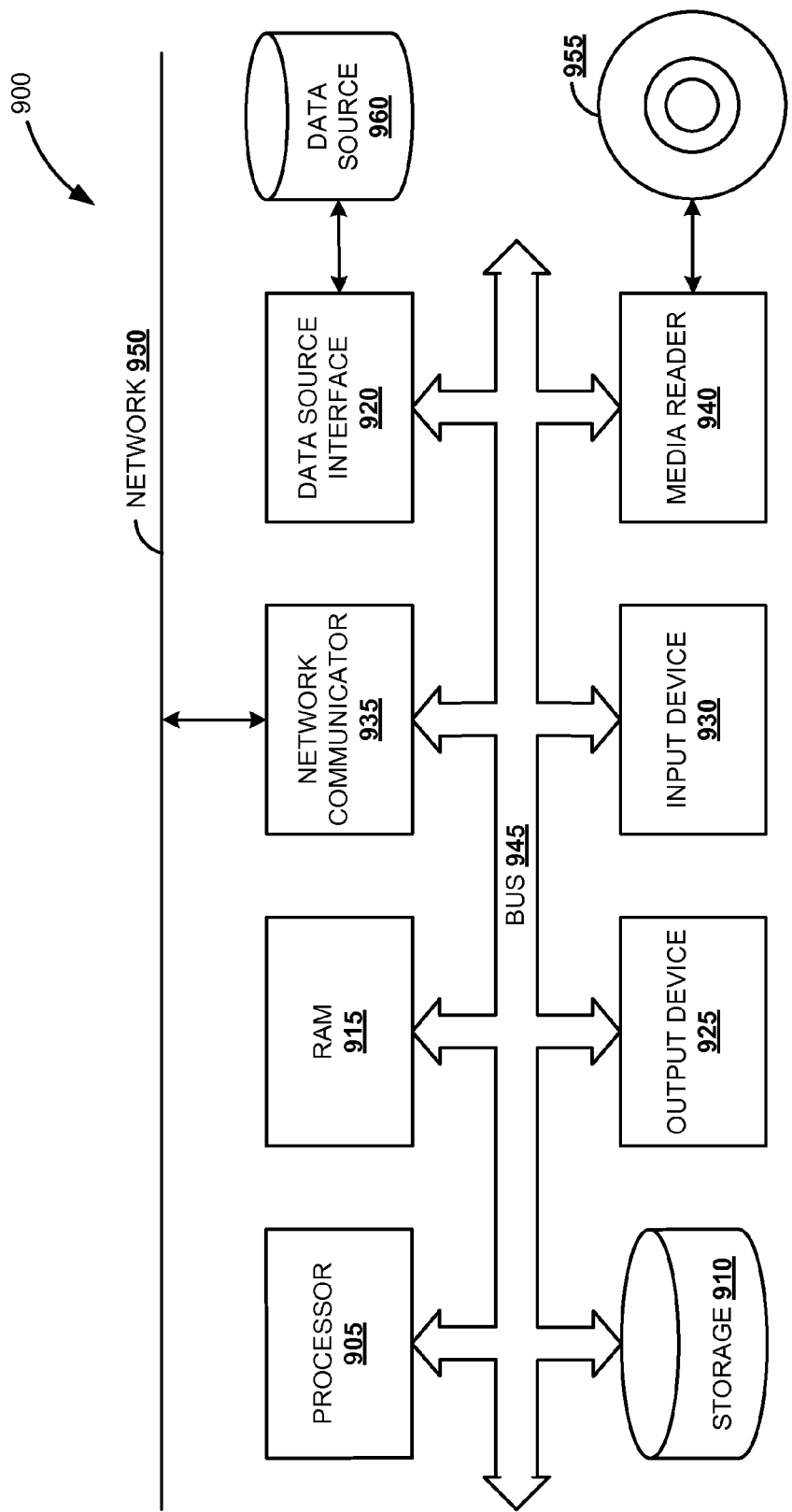
FIG. 9 is a block diagram of an exemplary computer system, according to an embodiment of the invention.

FIG. 9 is a block diagram of an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transient computer readable storage medium to tangibly store instructions, which when executed by a computer, cause the computer to perform operations comprising:
   identify a reporter object registered as a reporter for a scene, wherein the reporter object is registered as the reporter for the scene upon:
      receiving a request from the reporter object for registration as the reporter for the scene; and
      determining whether the reporter object satisfies a reporter admittance criterion specified for the scene;
   from the identified reporter object, receive information related to an incident associated with the scene;
   based upon the received information, identify the incident associated with the scene;
   determine whether the scene is dynamic scene or non-dynamic scene, wherein dynamic scene includes at least one incident whose type is not predefined and wherein a type of the incident refers to a type of data for which the incident is triggered;
   upon determining the scene as non-dynamic scene, determine whether the incident is valid incident, wherein the incident is valid incident when the incident is defined for the scene;
   upon determining the incident as non-valid incident, display an error message; and upon determining the incident as valid incident or the scene as dynamic scene, perform operations comprising:
      determining an observer object registered as an observer for the scene, wherein the observer object is separate from the reporter object and the observer object is registered as the observer for the scene upon:
         receiving a request from the observer object for registration as the observer for the scene; and
         determining whether the observer object satisfies an observer admittance criterion specified for the scene; and
      communicating the identified incident to the determined observer object.

2. The article of manufacture of claim 1, wherein the incident is triggered due to a modification of a data associated with the scene and wherein the data is one of a plurality of data types defined in a data dictionary.

3. The article of manufacture of claim 2, wherein the modified data is a multivalued data comprising a plurality of records.

4. The article of manufacture of claim 3, wherein the scene is represented by an interface including one or more functions through which at least one of the reporter object and the observer object query the scene to determine:
   a type of the incident;
   whether the incident is associated with the scene;
   whether the type of the incident is valid, wherein the type of the incident is valid when value of the data is one of a plurality of types defined in the data dictionary; and
   whether the incident is a multivalued incident, wherein the multivalued incident is the incident triggered in response to modification of multivalued data.

5. The article of manufacture of claim 4, wherein the interface includes an attribute indicating a name of the scene and an attribute indicating whether the scene is dynamic scene.

6. The article of manufacture of claim 4, wherein a class implementing the interface includes an attribute comprising one or more names of incidents associated with the scene.

7. The article of manufacture of claim 1, wherein the reporter object is at least one of a class, an interface, a logical runtime instance, an ABAP object, and a subclass.

8. The article of manufacture of claim 1, wherein the reporter object accesses a reporter protocol including one or more functions to report whether a value of a data associated with the scene is modified, added, or deleted.

9. The article of manufacture of claim 8, wherein the reporter protocol includes an attribute to allow the reporter object to access and query a current scene about the incident and wherein the reporter protocol includes an attribute comprising names of one or more scenes the reporter object is allowed to report.

10. The article of manufacture of claim 8, wherein reporting the incident includes reporting a name of the scene associated with the incident, reporting a name of the incident, and reporting at least one of:
    a value of the modified data;
    the value of the deleted data;
    the value of the newly added data; and
    an index number when the incident is related to a multivalued data comprising a plurality of records, wherein the index number identifies a record for which the incident is triggered.

11. The article of manufacture of claim 10, wherein the reporter object is associated with one or more scenes and wherein the reporter protocol includes a function to switch between the one or more scenes associated with reporter object such that when the reporter object is switched to one of the one or more scenes associated with reporter object the function reporting the incident excludes the name of the switched to scene while reporting the incident.

12. The article of manufacture of claim 1, wherein the observer object is at least one of a class, an interface, a logical runtime instance, an ABAP object implementing a specific ABAP interface, and a subclass.

13. The article of manufacture of claim 12, wherein the observer object includes an interface for communicating with an external entity and wherein the interface includes one or more functions that are called by the external entity to report incidents to the observer object including:
 data associated with the scene is modified;
 a new value of the data is added; and
 the value of the data is deleted.

14. A computer-implemented method for handling incidents related to business processes, the method comprising:
 identifying a reporter object registered as a reporter for a scene, wherein the reporter object is registered as the reporter for the scene upon:
  receiving a request from the reporter object for registration as the reporter for the scene; and
  determining whether the reporter object satisfies a reporter admittance criterion specified for the scene;
 from the identified reporter object, receiving information related to an incident associated with the scene;
 based upon the received information, identifying the incident associated with the scene;
 determining whether the scene is dynamic scene or non-dynamic scene, wherein dynamic scene includes at least one incident whose type is not predefined and wherein a type of the incident refers to a type of data for which the incident is triggered;
 upon determining the scene as non-dynamic scene, determining whether the incident is valid incident, wherein the incident is valid incident when the incident is defined for the scene;
 upon determining the incident as non-valid incident, displaying an error message; and upon determining the incident as valid incident or the scene as dynamic scene, performing the operations comprising:
  determining an observer object registered as an observer for the scene, wherein the observer object is separate from the reporter object and the observer object is registered as the observer for the scene upon:
   receiving a request from the observer object for registration as the observer for the scene; and
   determining whether the observer object satisfies an observer admittance criterion specified for the scene;
  and communicating the identified incident to the determined observer object.

15. The method of claim 14 further comprising:
 providing access of a reporter protocol to the registered reporter object to:
  access one or more functions for reporting the incident related to the scene; and
  access one or more attributes to directly query the scene.

16. The method of claim 14 further comprising:
 calling a function from an interface of the observer object to report whether a value of a data associated with the scene is modified, added, or deleted.

17. A computer system for handling incidents related to business processes comprising:
 a memory to store program code; and
 a processor communicatively coupled to the memory, the processor configured to execute the program code to:
  identify a reporter object registered as a reporter for a scene, wherein the reporter object is registered as the reporter for the scene upon:
   receiving a request from the reporter object for registration as the reporter for the scene; and
   determining whether the reporter object satisfies a reporter admittance criterion specified for the scene;
  from the identified reporter object, receive information related to an incident associated with the scene;
  based upon the received information, identify the incident associated with the scene;
  determine whether the scene is dynamic scene or non-dynamic scene, wherein dynamic scene includes at least one incident whose type is not predefined and wherein a type of the incident refers to a type of data for which the incident is triggered;
  upon determining the scene as non-dynamic scene, determine whether the incident is valid incident, wherein the incident is valid incident when the incident is defined for the scene;
  upon determining the incident as non-valid incident, display an error message; and
  upon determining the incident as valid incident or the scene as dynamic scene, perform the operations comprising:
   determining an observer object registered as an observer for the scene, wherein the observer object is separate from the reporter object and the observer object is registered as the observer for the scene upon:
    receiving a request from the observer object for registration as the observer for the scene; and
    determining whether the observer object satisfies an observer admittance criterion specified for the scene;
   and communicating the identified incident to the determined observer object.

18. The computer system of claim 17, wherein the processor is further configured to execute the program code to:
 provide access of a reporter protocol to the registered reporter object to enable the reporter object to access one or more functions for reporting the incident related to the scene and to enable the reporter object to access one or more attributes to directly query the scene; and
 call a function from an interface of the observer object to report whether a value of a data associated with the scene is modified, added, or deleted.

* * * * *